(12) United States Patent
Mak

(10) Patent No.: US 8,398,748 B2
(45) Date of Patent: Mar. 19, 2013

(54) CONFIGURATIONS AND METHODS FOR ACID GAS ABSORPTION AND SOLVENT REGENERATION

(75) Inventor: John Mak, Santa Ana, CA (US)

(73) Assignee: Fluor Technologies Corporation, Aliso Viejo, CA (US)

(*) Notice: Subject to any disclaimer, the term of this patent is extended or adjusted under 35 U.S.C. 154(b) by 949 days.

(21) Appl. No.: 11/911,789

(22) PCT Filed: Apr. 18, 2006

(86) PCT No.: PCT/US2006/014710
§ 371 (c)(1),
(2), (4) Date: Apr. 21, 2008

(87) PCT Pub. No.: WO2006/118795
PCT Pub. Date: Nov. 9, 2006

(65) Prior Publication Data
US 2008/0184887 A1  Aug. 7, 2008

Related U.S. Application Data

(60) Provisional application No. 60/676,131, filed on Apr. 29, 2005.

(51) Int. Cl.
*B01D 53/14* (2006.01)
(52) U.S. Cl. ........... 95/162; 95/163; 95/165; 95/166; 95/167; 95/168; 95/179; 95/180; 95/193; 95/209; 96/234; 96/242
(58) Field of Classification Search .......... 95/174, 95/164, 169, 181, 183, 204, 207, 235–236; 96/218, 242; 423/220, 228–229, 223
See application file for complete search history.

(56) References Cited

U.S. PATENT DOCUMENTS

| | | | | |
|---|---|---|---|---|
| 3,242,644 A | * | 3/1966 | Woertz | 95/177 |
| 3,375,639 A | * | 4/1968 | Miller et al. | 96/181 |
| 3,714,327 A | * | 1/1973 | Giammarco | 423/220 |
| 4,073,863 A | * | 2/1978 | Giammarco et al. | 423/222 |
| 4,146,569 A | * | 3/1979 | Giammarco et al. | 423/222 |
| 4,152,217 A | * | 5/1979 | Eisenberg et al. | 203/2 |
| 4,271,132 A | * | 6/1981 | Eickmeyer | 423/223 |
| 4,293,531 A | * | 10/1981 | Field et al. | 423/232 |
| 4,397,660 A | | 8/1983 | Van der Pas-Toornstra | |
| 4,548,620 A | * | 10/1985 | Albiol | 95/174 |
| 5,137,550 A | * | 8/1992 | Hegarty et al. | 95/174 |

(Continued)

FOREIGN PATENT DOCUMENTS

EP  0588175  3/1994
JP  EP 588175 A2 * 3/1994

(Continued)

*Primary Examiner* — Duane Smith
*Assistant Examiner* — Ives Wu
(74) *Attorney, Agent, or Firm* — Fish & Associates, PC

(57) ABSTRACT

Contemplated configurations and methods include a solvent regenerator (58) that has an upper (93) and a lower stripping section (94). Cooled rich solve is used as reflux while heated rich solvent (11) is used as a source of stripping agent in the upper section (91). A reboiler (62) in the lower section provides further stripping agent, hi especially preferred configurations, a portion of lean solved from the regenerator (58) is further stripped in a separate or integrated regenerator (62) to form an ultra-lean solvent. Both lean and ultra-lean solvents are preferably used in a two-stage absorber (52) to thereby from the rich solvent and an offgas that is very low in acid gas.

12 Claims, 6 Drawing Sheets

U.S. PATENT DOCUMENTS

| | | | | |
|---|---|---|---|---|
| 6,071,484 | A * | 6/2000 | Dingman et al. | 423/229 |
| 6,139,605 | A * | 10/2000 | Carnell et al. | 95/164 |
| 6,800,120 | B1 * | 10/2004 | Won et al. | 96/234 |
| 7,147,691 | B2 * | 12/2006 | Palmer | 95/186 |
| 7,377,967 | B2 * | 5/2008 | Reddy et al. | 96/242 |
| 2006/0110300 | A1 * | 5/2006 | Mak | 422/190 |
| 2008/0127831 | A1 * | 6/2008 | Rochelle et al. | 96/181 |

FOREIGN PATENT DOCUMENTS

| | | |
|---|---|---|
| WO | 2004/005818 | 1/2004 |

* cited by examiner

Prior Art Figure 1

CONFIGURATIONS AND METHODS FOR ACID GAS ABSORPTION AND SOLVENT REGENERATION

This application claims priority to our copending U.S. provisional patent application with the Ser. No. 60/676,131, which was filed Apr. 29, 2005.

FIELD OF THE INVENTION

The field of the invention is acid gas removal and solvent regeneration, especially as it relates to absorption of hydrogen sulfide with an amine solvent and regeneration of the rich solvent to produce a lean solvent.

BACKGROUND OF THE INVENTION

Acid gas removal from gas streams, and especially removal of hydrogen sulfide and carbon dioxide from gas streams formed in oil/production facilities, refinery process units, and/or synthesis gas production plants is required to avoid release of the acid gas into the environment. Most commonly, the bulk of the sulfur content is converted in a processing unit into elemental sulfur or other commodities (e.g., sulfuric acid, sodium bi-sulfate, etc.), while the tail gas of such processing units is further treated to reduce its sulfur content before venting to the atmosphere.

Among other known processes, acid gases are most typically removed using an amine-based solvent to absorb the acid gas via various chemical reactions to thereby produce a rich amine solvent, which is then regenerated using heat. Exemplary aspects of gas purification using amine solvents are taught in the "Fifth Edition Gas Purification" by Arthur Kohl and Richard Nielsen (Gulf Publishing, 1960 to 1997). Particularly preferred amine-based solvents include secondary and tertiary amines (e.g., diethanolamine [DEA], and/or methyldiethanol-amine [MDEA]), which are generally more energy efficient than primary amines due to their lower heat of reaction and lower energy requirements for regeneration. Further known amines also include monoethanolamine [MEA], diglycolamine [DGA], triethanolamine [TEA], diisopropylamine, and various combinations thereof, which may still further comprise one or more additives.

The effectiveness of a particular amine solvent to absorb acid gases to meet the treated gas specification typically depends on the residual acid gas content in the lean amine, which in turn is a function of the particular regeneration method and conditions. The lower the acid gas content in the lean amine, the more effective is the acid gas absorption process to achieve the desirable result in the treated gas. Unfortunately, the energy demand for heating and cooling processes in the amine regeneration unit significantly increases with decreasing residual acid gas content in the lean amine. Therefore, numerous approaches have been undertaken to improve the current acid gas absorption and regeneration processes.

For example, Dingman, et al. describe in U.S. Pat. No. 6,071,484 a method to produce an ultra lean amine using an ion exchange bed to remove the residual acid gases in the lean amine. While such a process reduces steam consumption in the regenerator reboiler, various new disadvantages arise. Most significantly, ion exchange resins are relatively expensive and need to be regenerated or replaced, and where regeneration is preferred, regeneration transfers the acid gas only from one place to another. In yet another example, as described in U.S. Pat. No. 4,798,910 to Herrin, the inventor uses an additional heat exchanger to heat the rich amine solvent using a portion of the heat content in the regenerator overhead gases. While such a method advantageously reduces the overhead condenser duty to at least some degree, reboiler duty remains largely unaffected, as the amine regeneration process is more strongly dependent on the stripping steam supplied at the bottom of the regenerator.

Still further configurations and methods for amine absorption and regeneration are disclosed in U.S. Pat. No. 3,565,573 to Thirkell in which acid gas is treated in a dual-zone absorber to provide a rich solvent that is regenerated in conventional manner. Similarly, Green et al. describe in U.S. Pat. No. 3,829,521 a configuration in which a pre-stripper and a stripper operate in series to remove acid gas from two gas streams. While such configurations and methods improve gas treatment in at least some respect, other problems remain. Most significantly, deep removal of acid gases to meet a stringent treated gas specification (e.g., less than 10 ppmv) is typically not achievable, or uneconomic due to the expense of relatively high energy costs in the operation of the regenerator or regenerators.

In addition to the problems associated with the energy demand of amine regeneration, condensation and foaming of heavy hydrocarbons and aromatics in the absorber often renders gas treatment ineffective, and may even cause column instability and/or flooding. To avoid such unstable situation, the absorber can be operated at a higher temperature to avoid the feed gas from dropping below its dew point temperature inside the absorber. Higher temperature operation is often achieved using a higher lean amine temperature. However, a higher lean amine temperature renders hydrogen sulfide absorption less effective due to less favorable amine-hydrogen sulfide equilibrium conditions, which is particularly problematic in low pressure units where the partial pressure of $H_2S$ is much lower and less favorable (e.g., to treat tail gas of a sulfur plant).

Still further, process integration often leads to plant configurations in which a single source of lean amine is used to supply all process units. While integration often simplifies the amine regeneration operation, integration is frequently not energy efficient as lean amine loadings typically vary among different process units. For example, a hydrotreater unit, which operates at high pressure with less stringent treating requirement can accept a lean amine with a higher lean amine loading (typically 0.01 or higher mole of $H_2S$ to mole of amine), while a tail gas treating unit must often use a very lean amine (typically 0.005 or lower mole of $H_2S$ to mole of amine) to meet the emission requirement. Thus, use of a single source of lean amine designed for the more demanding treating requirement results in over-stripping for the less demanding units. This is particularly problematic when an existing facility is expanded to include more demanding units such as the tail gas treatment unit, which would require upgrading the entire amine regeneration system. Consequently, and especially where stringent emission specifications are encountered, currently known methods and configurations are often neither adequate, nor energy efficient/economical in operation.

Thus, while numerous compositions and methods for acid gas absorption and solvent regeneration are known in the art, all or almost all of them, suffer from one or more disadvantages. Therefore, there is still a need for improved configurations and methods for acid gas absorption and solvent regeneration.

SUMMARY OF THE INVENTION

The present invention is directed to configurations and methods of acid gas absorption and solvent regeneration in which the acid gas is absorbed in an absorber having two sections using an ultra-lean solvent and a lean solvent. So generated rich solvent is then regenerated in a regenerator having two sections in which one portion of the rich solvent is employed as a reflux and in which another portion of the rich solvent provides stripping medium to the regenerator, thereby reducing both reboiler and condenser duties. In preferred configurations, the ultra-lean solvent is formed in a separate non-refluxed regenerator using the lean solvent from the regenerator, or formed in a combined regenerator having two or more sections.

In one aspect of the inventive subject matter, a plant includes a solvent regenerator having an upper section and a lower section, wherein the upper section has a first rich solvent inlet that is configured to provide a rich solvent reflux, and a second rich solvent inlet that is configured to provide a heated rich solvent regenerator feed. The lower section is configured to produce a lean solvent from the rich solvent reflux and the heated rich solvent regenerator feed, and a heater is operationally coupled to the regenerator and configured to heat a portion of a rich solvent to thereby provide the heated rich solvent regenerator feed.

In especially contemplated plants, a second regenerator is included and configured to receive the lean solvent from the lower section of the solvent regenerator to produce an ultra-lean solvent from the lean solvent. In such plants, an absorber having an upper section and a lower section may be included and be configured to receive the ultra-lean solvent and the lean solvent in the upper section. Where the feed gas is at elevated pressure, a flash vessel may be coupled to the absorber and configured to flash the rich solvent from the absorber. In still further preferred aspects, the plant includes a heat exchanger that is configured to heat untreated gas prior to entry into the absorber to thereby cool the rich solvent reflux and to prevent hydrocarbon condensation.

In other especially contemplated plants, a regenerator includes two sections with the upper section producing a lean solvent using a side reboiler, wherein the lean solvent is withdrawn by a chimney, and a lower section producing an ultra lean solvent using a bottom reboiler. In such plants, an absorber having an upper section and a lower section may be included and be configured to receive the ultra-lean solvent and the lean solvent in the upper section. Where the feed gas is at elevated pressure, a flash vessel may be coupled to the absorber and configured to flash the rich solvent from the absorber. In still further preferred aspects, the plant includes a heat exchanger that is configured to heat untreated gas prior to entry into the absorber to thereby cool the rich solvent reflux and to prevent hydrocarbon condensation.

Therefore, in another aspect of the inventive subject matter, a method of regenerating a solvent includes a step of feeding a first portion of a rich solvent as reflux to a first section of a regenerator, and feeding a heated second portion of the rich solvent to the first and/or second section of the regenerator, wherein the second portion has a temperature sufficient to provide at least a portion of stripping medium to the first section. In another step, a lean solvent is formed in a second section of the regenerator from the first and second portions.

It is generally preferred that in contemplated methods a heat exchanger heats the second portion of the rich solvent using heat from a bottom product of the regenerator, and/or that the first portion of the rich solvent is cooled prior to the step of feeding the first portion to the first section of the regenerator. Typically, at least a portion of the bottom product of the regenerator is routed to a second regenerator to thereby form an ultra-lean solvent, and an absorber is coupled to the regenerator to produce the rich solvent.

Furthermore, it is generally preferred that the absorber has an upper section and a lower section, wherein the ultra-lean solvent and the lean solvent are fed to the upper section of the absorber. Where desirable (e.g., where the untreated gas has elevated pressure), it is contemplated to flash the rich solvent before the rich solvent is divided into a first and second portion. In still further aspects of contemplated methods, the untreated gas may be heated in a heat exchanger prior to entry into the absorber to thereby cool the first portion of the rich solvent, and/or to combine the absorber overhead product with a portion of the ultra-lean solvent to produce a semi-lean solvent (which may then be fed to the upper section of the regenerator as a reflux stream).

In yet another aspect of the inventive subject matter, a plant includes a two-stage absorber that has an upper section and a lower section, wherein the absorber is configured to produce a rich solvent. A flow control element (e.g., valve, manifold, etc.) is fluidly coupled to the absorber in such plants and is configured to split the rich solvent into a first and a second portion. It is further preferred that a heater is coupled to a conduit that transports the second portion of the rich solvent, wherein the heater is configured to heat the second portion of the rich solvent. Most typically, the regenerator has an upper section and a lower section, wherein the regenerator is configured to produce a lean solvent from the first and second portions of the rich solvent, and a first and second conduit are fluidly coupled to the flow control element such that (a) the first conduit feeds the first portion of the rich solvent to the upper section of the regenerator as reflux, and (b) the second conduit feeds the heated second portion of the rich solvent to the upper section of the regenerator as regenerator feed. It is further preferred in such plants that the heater is a heat exchanger configured to use heat of the lean solvent for the heating the first portion of the rich solvent, and/or that a heat exchanger is included that is configured to heat untreated gas before entry into the absorber using heat from the second portion of the rich solvent. Where desirable, a flash vessel may be included that receives the rich solvent, wherein the flash vessel is coupled to the absorber in a position upstream of the first and second conduits.

Various objects, features, aspects and advantages of the present invention will become more apparent from the following detailed description of preferred embodiments of the invention.

BRIEF DESCRIPTION OF THE DRAWINGS

Prior Art

DETAILED DESCRIPTION

The inventor has discovered that acid gas absorption and solvent regeneration can be performed in an economically attractive and conceptually simple manner in which the acid gas is adsorbed in a two-stage absorber using a lean (e.g., with 0.01 or higher mole of $H_2S$ to mole of amine) and an ultra-lean solvent (e.g., with 0.005 or lower mole of $H_2S$ to mole of amine) which are produced in a refluxed and a non-refluxed regenerator, respectively. Most preferably, the refluxed regenerator has two stages and is operated such that cool rich solvent is employed as reflux while heated rich solvent provides at least a portion of the stripping medium. Thus, the reboiler and condenser duties are significantly reduced, even though the stripping can be performed at a higher temperature.

In contrast, a substantial amount of excess steam in the overhead of currently known regenerators is required to obtain an adequate degree of stripping in a regenerator. Further, the minimum amount of heat required for solvent regeneration is the sensible heat required to raise the solvent to the regenerator bottoms temperature plus the heat of reaction for dissociating the adsorbed acid gases. Excess heat (in the form of steam) is rejected in the regenerator overhead and so necessitates a cooler using air or cooling water to condense the water from the desorbed acid gas. The amount of excess steam is defined as "reflux ratio", which is the molar ratio of steam to acid gases in the regenerator overhead, and it ranges from 2:1 to 3:1. A high reflux ratio ensures sufficient steam is supplied for stripping the amine for the generation of a lean amine. Consequently, the high reflux ratio also results in a larger amount of steam that needs to be condensed. Thus, most or all of the known configurations require substantial quantities of heating and cooling for solvent regeneration.

Figure 1:
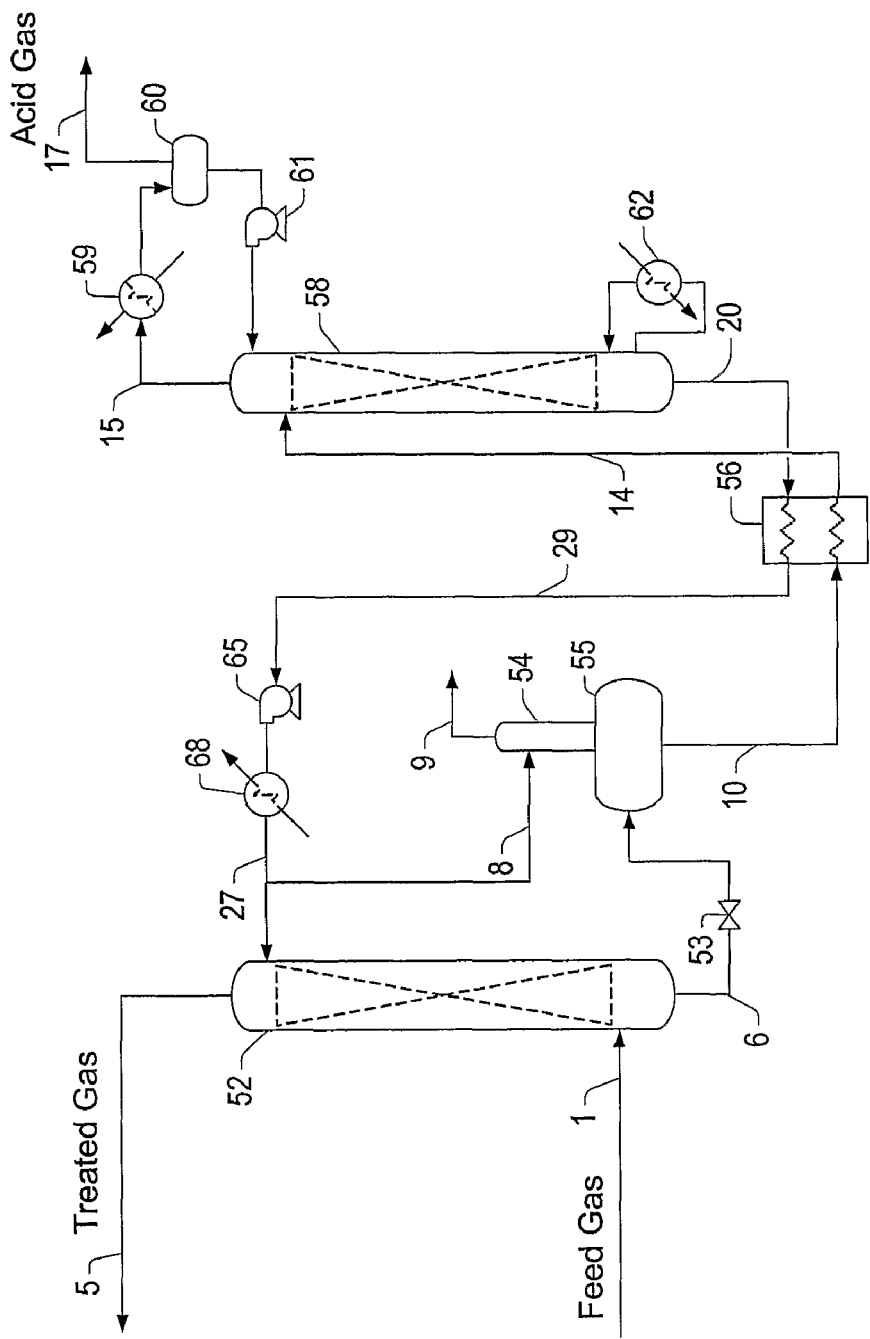
FIG. 1 is a schematic of an exemplary known plant configuration.

An exemplary known absorber/regenerator configuration is depicted in Prior Art FIG. 1. Here, lean amine 27 is employed to absorb the H2S and CO2 content from an untreated sour feed gas 1 using an amine absorber 52, producing a treated gas stream 5 and a rich amine stream 6. The rich amine 6, saturated with the acid gas components, is letdown in pressure via JT valve 53 to a rich amine flash drum 55, generating a vapor stream 9 and a rich amine stream 10. The acid gas content in the flashed vapor is scrubbed using a column 54 using lean amine stream 8 prior to being used as fuel gas or being routed to another component of the plant. The rich amine 10 is heated in the lean/rich exchanger 56 using heat from the regenerator bottoms stream 20 forming stream 14, which is fed to regenerator 58. The cooled lean amine 29 is typically pumped to absorber pressure using pump 65 and further cooled using cooler 68 prior to adsorption in absorbers 52 and 54. Stripping steam for the regenerator 58 is supplied by reboiler 62 that removes the acid gases from the rich amine descending down the column. The so desorbed acid gases leave the column as overhead stream 15, pass through condenser 59 to condense the water, which is then separated from the acid gas stream 17 in separator 60, and pumped back into the regenerator 61.

While for some refinery process units a lean amine loading of 0.05 for DEA and 0.01 for MDEA are acceptable and a reflux ratio of 1:1 to 2:1 is satisfactory, the lean amine loading in lower pressure units, and especially those with stringent emission requirements, must be further reduced to 0.01 for DEA and 0.001 for MDEA with a corresponding increase in the reflux ratio to 3:1 to 4:1 or higher, making acid gas removal using such configurations economically problematic. Moreover, it should also be appreciated that the condenser reflux system (reflux condenser 59, reflux drum 60, and reflux pump 61) is constructed of relatively expensive materials (typically alloy steel materials), which adds to the incentive to reduce condenser duty.

The regenerator reboiler duty can be reduced in most known configurations using a lean/rich amine exchanger 56 to raise the temperature of the rich amine stream 14 using the regenerator bottoms stream 20, reducing the sensible heating requirement. Typically, the rich amine temperature is increased to 210° F. to 225° F. with the regenerator bottoms typically at 250° F. to 270° F. Higher inlet temperatures are generally not desirable as this would merely increase the flashing of steam from the rich amine, and increase the overhead condenser duty without any benefits of a reduction in reboiler duty. Consequently, the lean amine stream 29 exiting the lean/rich exchanger 56 is still at a fairly high temperature, typically 170° F. to 190° F. which must be rejected to the lean amine cooler 68, and a significant portion of the waste heat cannot be recovered.

In contrast, the configurations and methods according to the inventive subject matter reduce, and in most cases even eliminate the difficulties presented above by using a refluxed primary regenerator having two stripping sections and a non-refluxed secondary regenerator. In such configurations, the rich solvent is (flashed where appropriate to a lower pressure and) split into two portions, wherein one portion is cooled (preferably by the feed gas) and routed as reflux to the upper stripping section in the primary regenerator while the second portion is heated to a higher temperature by the regenerator bottoms and routed to a lower portion of the upper stripping section (and/or upper portion of the lower section) as solvent feed, thereby supplying at least a portion of the stripping steam to the upper stripper section. The solvent is fully regenerated in the lower stripping section of the primary regenerator that is also fluidly coupled to a secondary regenerator. The primary regenerator produces a lean amine that is split into two portions: One portion is fed to the absorber (or absorbers) for general refinery usage, and the other portion is further processed in the secondary regenerator to produce an ultra-lean solvent for stringent treating applications. It should also be noted that the overhead vapor from the secondary regenerator supplies at least a portion of the stripping steam to the primary regenerator. In further preferred aspects, the absorber has two absorption sections that receive the ultra-lean solvent at the upper section and the lean solvent at the lower section. Where desired, the treated gas from the absorber may be mixed with a portion of the ultra-lean solvent, cooled in an exchanger, and separated to produce a treated gas with even further reduced sulfur content.

Figure 2:
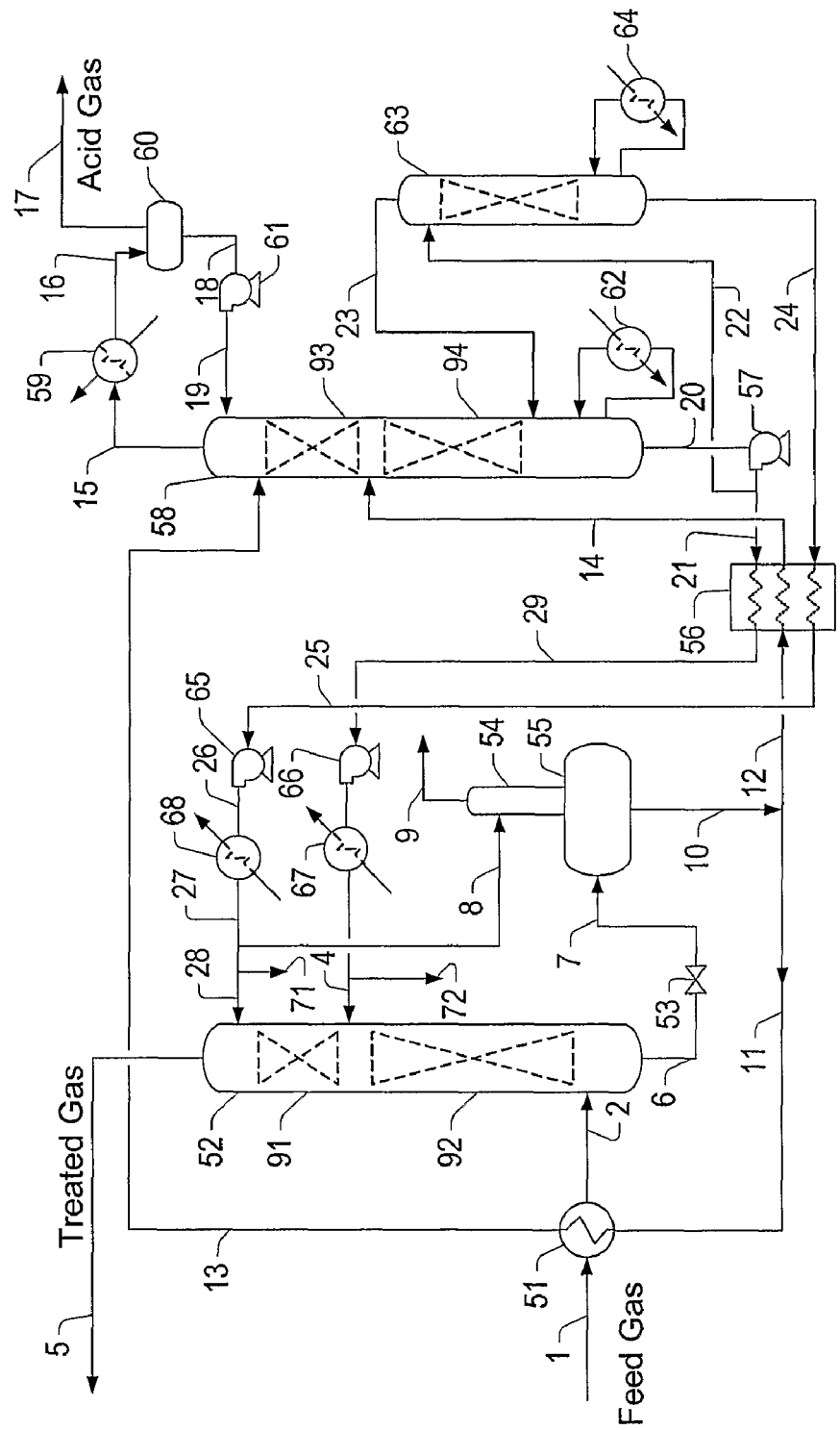
FIG. 2 is a schematic of one exemplary configuration according to the inventive subject matter.

In one exemplary contemplated configuration as depicted in FIG. 2, untreated sour feed gas stream 1, typically at 100° F., is heated in exchanger 51 using rich amine stream 11 to about 110° F. prior to entering absorber 52 as heated stream 2. The amine absorber 52 has two absorption sections that use an ultra lean amine stream 28 in upper absorption section 91 and a lean amine stream 4 in lower absorption section 92, producing an overhead treated gas stream 5 and a rich amine stream 6, typically at about 160° F. The rich amine 6 is letdown in pressure via valve 53 to about 50 psig to form stream 7 that is routed to the rich amine flash drum 55, which produces a vapor stream 9 and a rich amine stream 10.

At this point, rich amine stream 10 is preferably split into two portions that are routed to different stripping sections of the primary regenerator 58. The flow ratio (i.e., the flow rate of stream 11 divided by stream 10) is typically 0.1 to 0.3, which can be adjusted to reduce the condensing duty and reboiler duty of the regenerators. The first portion, stream 11, is cooled to about 140° F. with feed gas 1 in heat exchanger 51 forming reflux stream 13 that is routed to the top of the upper stripping section 93 of the primary regenerator 58. The second portion, stream 12, is heated in the lean/rich exchanger 56 to form stream 14, typically at 230° F. to 250° F. Stream 14 is fed to the upper portion of the lower stripping section 94 of the primary regenerator. It should be especially appreciated that stream 14 contains a significant quantity of the flashed steam which is now used as stripping steam for stream 13 descending down the upper stripping section 93. The solvent is further stripped in the lower section 94 of the primary regenerator using reboiler 62, producing a lean amine stream 20. Acid gas leaves the regenerator 58 as stream 15, which is routed through condenser 59 as stream 16 to the reflux drum 60. Form the drum 60, acid gas stream 17 is then fed to a Claus plant or other downstream unit. Condensate 18 is pumped via pump 18 back to the column as stream 19.

The primary regenerator bottom product 20 is pumped by bottoms pump 57 and then split into two portions, stream 21 and stream 22. Stream 21 is cooled in the lean/rich exchanger 56 to form stream 29, pumped by pump 66, and then cooled in exchanger 67 forming stream 4, which is fed to the lower absorption section 92 of absorber 52. Optionally, lean amine stream 72 can be used for acid gas absorption in one or more refinery process units. Stream 22 is routed to secondary regenerator 63 that uses stripping steam from reboiler 64 to produce an ultra-lean solvent stream 24 and acid gas stream 23, which also contains stripping steam. Stream 24 is then cooled in the lean/rich exchanger 56 to form stream 25, pumped by pump 65 to form stream 26, further cooled in exchanger 68 prior to being fed to the upper absorption section 91 as stream 28 via stream 27. Optionally, the ultra lean solvent stream 71 can be used for acid gas absorption in one or more refinery process units that require stringent emission controls. A portion of ultra-lean solvent 27 is used as stream 8 to scrub the flashed vapors in scrubber 54.

Figure 3:
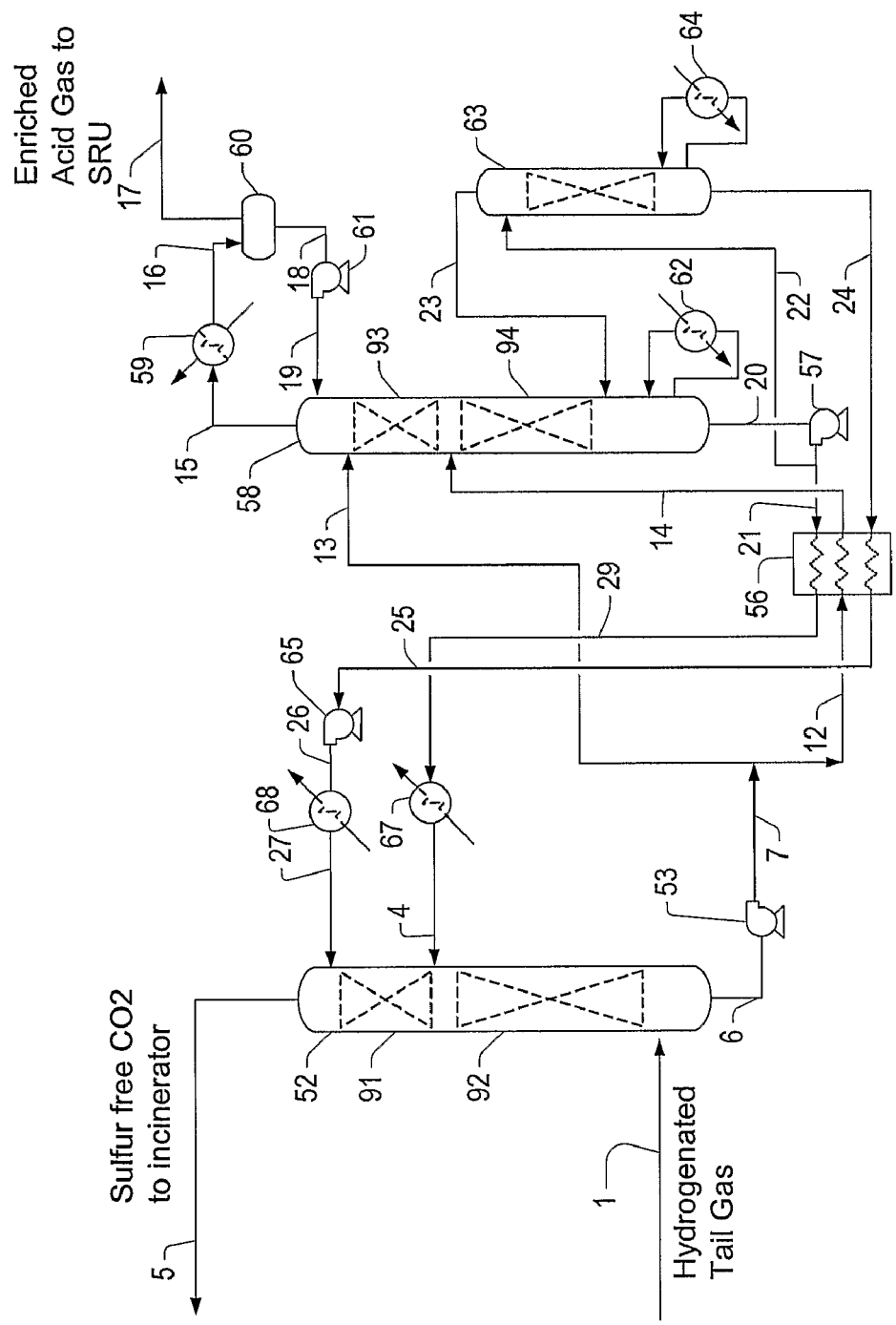
FIG. 3 is a schematic of another exemplary configuration according to the inventive subject matter.

Under conditions where the pressure of the untreated gas is relatively low (e.g., tail gas, regenerator gases, flue gases), and especially where emission of hydrogen sulfide needs to be reduced as to a relatively low level, contemplated configurations may also be as shown in the exemplary plant of FIG. 3. Here, the untreated acid feed gas will usually not contain heavy hydrocarbons and therefore feed gas superheating is not required. Moreover, as the untreated gas has a low pressure (typically below 10 psig), no flash drum is present and the rich amine stream 6 will be pumped by pump 53 to feed the regenerator via the lean/rich exchanger. Once more, it should be appreciated that the dual absorption sections and the dual stripping sections will significantly reduce the amine circulation and the energy consumption of the regeneration operation in a substantially similar manner as described for FIG. 2 above. Furthermore, with respect to components in FIG. 3 having same numerals as like components in FIG. 2, the same considerations as described above apply (with the exception of absorber pressure and the flash vessel).

Figure 4:
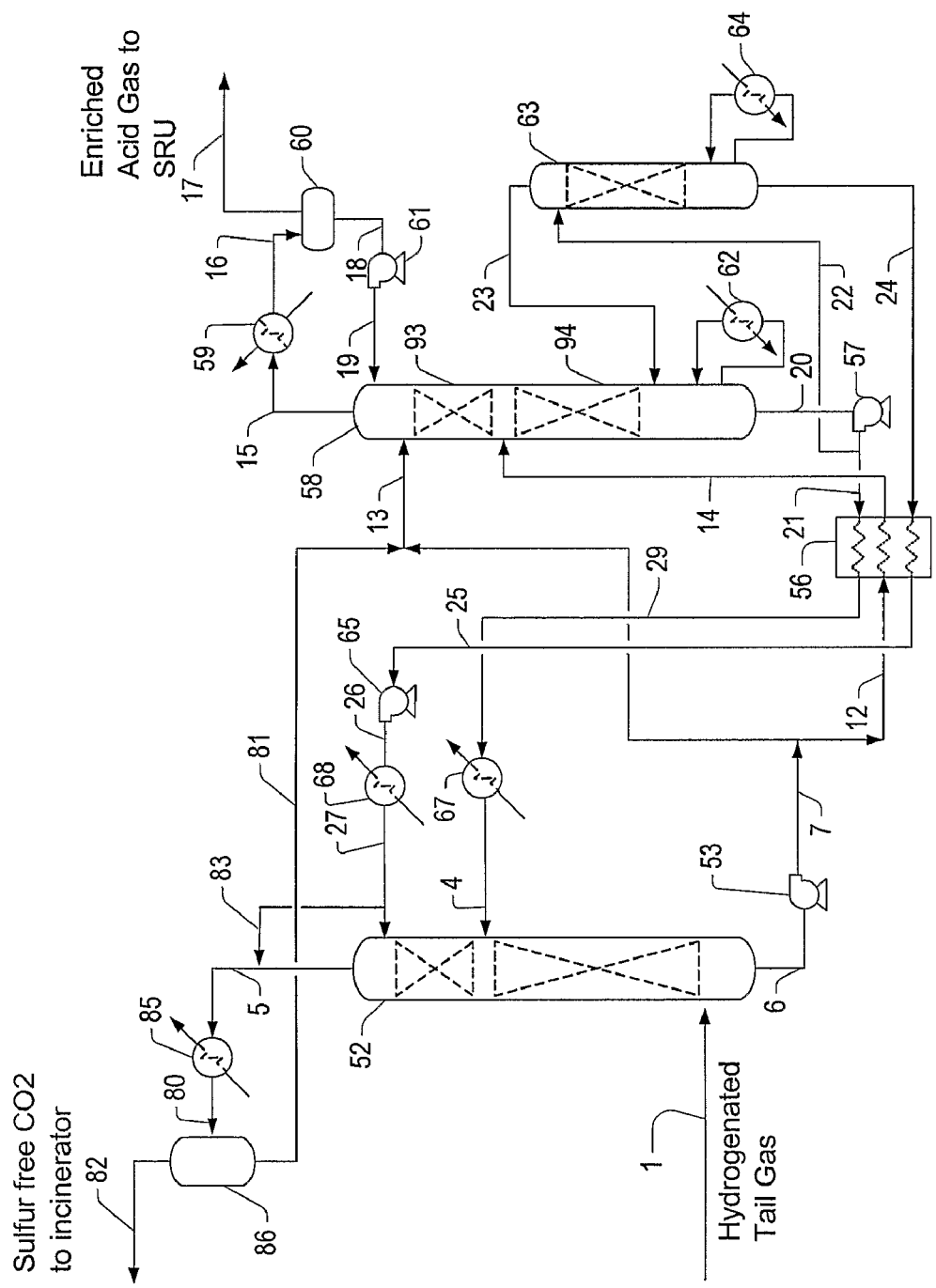
FIG. 4 is a schematic of a further exemplary configuration according to the inventive subject matter.

Alternatively, or additionally, the absorber overhead product may be treated to deplete the overhead product even further of acid gas, and an exemplary configuration for such option is depicted in FIG. 4. In such configurations, a portion of the ultra lean amine 83 is mixed with the absorber overhead stream 5, and then cooled in exchanger 85 forming stream 80. Cooling water or chilled water refrigeration system can be used in the exchanger, as the lower temperature favors H2S equilibrium and will enhance the absorption process. The ultra lean amine and the treated gas are preferably completely mixed inside the exchanger tubes (which provides an additional equilibrium stage). The two-phase stream 80 is then separated in separator 86 forming a treated gas stream 82 and a solvent stream 81. The so obtained gas stream 82 is then disposed of in an appropriate manner, while solvent stream 81 is mixed with stream 13 and fed to the upper stripping section 93 of the primary regenerator. Using such post-treatment, it is expected that the H2S content in the so treated gas can be reduced by 50% or more (as compared to the absorber overhead).

Figure 5:
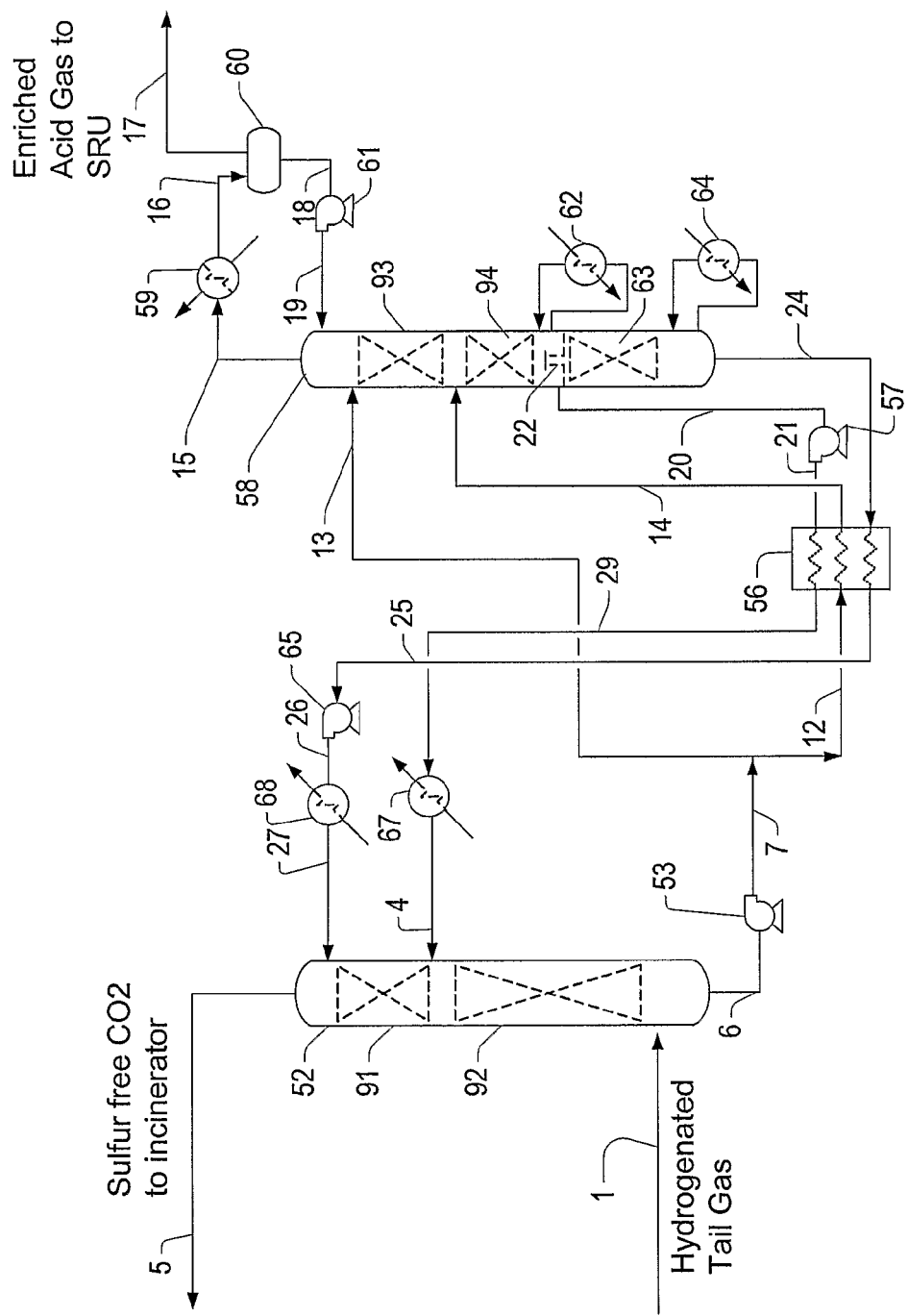
FIG. 5 is a schematic of a still further exemplary configuration according to the inventive subject matter.

Alternatively, or additionally, for process simplification and plot space savings, the reflux regenerator 93 and 94 and the non-reflux regenerator 63 can be combined in a single column to achieve the same results as the dual column configuration of FIGS. 3 and 4, and an exemplary configuration for such option is depicted in FIG. 5. In such configurations, the lean amine is regenerated in the upper sections 93 and 94, using stripping steam supplied by a side reboiler 62, and a portion of the lean solvent stream 20 is withdrawn from chimney tray 22, pumped by the lean solvent pump 57 to the lean/rich exchanger 56 supplying the absorber 52. The remaining lean solvent overflows through the chimney tray 22 to the lower regenerator section 63 to be further stripped using steam supplied in the bottom reboiler 64, producing the ultra lean amine stream 24 supplying the absorber 52. Most typically, the integrated regenerator will produce a lean solvent (typically with 0.008, more typically 0.01, and most typically 0.015, or even higher hydrogen sulfide to amine loading ratio), using a side reboiler via a side-draw from a chimney tray in the regenerator. The regenerator will also produce a bottom ultra lean solvent (typically with 0.015, more typically 0.01, and most typically 0.005, or even lower hydrogen sulfide to amine loading ratio) using a bottom reboiler. Once more, it should be appreciated that the single column regenerator will serve the same functions and produce the same results as the dual column generation sections in terms of amine circulation and energy consumption. Furthermore, with respect to components in FIG. 5 having same numerals as like components in FIG. 3, the same considerations as described above apply.

Figure 6:
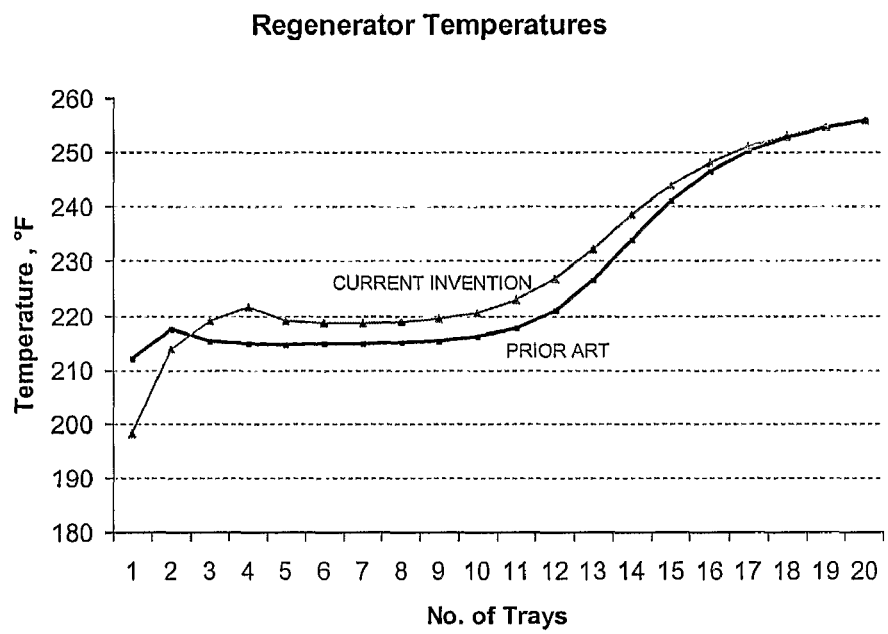
FIG. 6 is a graph comparing the temperature profile in an amine regenerator of the present inventive subject matter and a regenerator of a known configuration.

FIG. 6 illustrates an exemplary temperature profile of the primary regenerator of the configurations according to the inventive subject manner as compared to the temperature profile in an absorber of a plant according to Prior Art FIG. 1. It should be especially noted that with the dual stripping sections, the regenerator of the present inventive subject matter operates at a higher temperature in the lower stripping section, which results in a higher stripping ratio, and with that in a more effective stripping. Conversely, it should be appreciated that the top temperature of the upper stripping section is lower, resulting in a lower reflux condensing duty. Therefore, contemplated configurations will achieve significantly higher stripping efficiency at lower operational cost as compared to currently known configurations.

Figure 7:
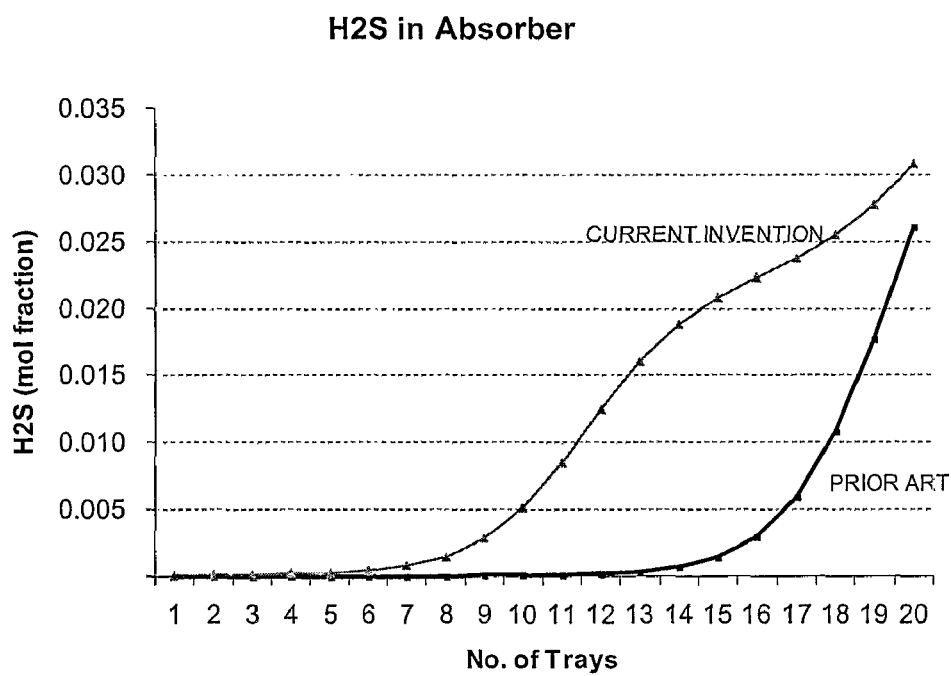
FIG. 7 is a graph comparing hydrogen sulfide concentration in an amine regenerator of the present inventive subject matter and a regenerator of a known configuration.

FIG. 7 depicts an exemplary comparison of the H2S content in the vapor in the absorber of contemplated configurations as compared to that of configurations according to Prior Art FIG. 1. Most notably, the H2S concentration of contemplated configurations is generally higher in the lower absorption section, and lower in the top of the upper absorption section. The higher H2S concentration in the lower section is due to a higher acid gas pickup (mole of gas acid of rich amine minus mole of acid gas in the lean amine), resulting in a lower solvent flow. The low H2S in the top of the absorber is the result of using an ultra lean solvent for absorption that is more effective in treating to a low level. Based on these and other calculations (not shown), it should be readily apparent that H2S removal efficiency and solvent requirement are significantly improved over heretofore known configurations.

Therefore, it should be recognized that contemplated configurations and methods make use of two lean solvent streams with different lean loadings via a primary regenerator that is fluidly integrated with a secondary amine regenerator to meet different process requirements. Furthermore, contemplated configurations allow flexibility of adjusting the lean loadings of the two lean amines, which eliminates over-stripping and reduces energy consumption. Adding to the effectiveness of contemplated configurations is the use of overhead vapor from the secondary regenerator as stripping steam to the primary regenerator, which further reduces energy consumption.

With respect to the solvents, it is generally contemplated that all known physical and chemical solvents (and various mixtures thereof) for acid gas removal are deemed suitable herein. However, particularly preferred solvents include amine solvents, and especially primary and secondary amines. As contemplated configurations preferably employ two sections in the absorber (using ultra-lean amine from the secondary regenerator for the upper section, and lean amine from the primary absorber for the lower section), amine circulation can be reduced while achieving stringent sulfur specifications in the treated gas.

It should still further be particularly appreciated that by splitting the rich solvent into two portions significant energy savings are realized as the first portion is used as reflux in the upper section and the second (heated) portion is routed to the lower section: The first portion supplies a portion of the regenerator condenser cooling, reducing the duty by at least 30% or higher, while the second portion supplies stripping steam to the upper stripping, reducing the regenerator reboiler duty by at least 20% or higher. Moreover, in at least some configurations the heat content in the first portion of the rich amine is advantageously used to raise the absorber feed temperature to above its hydrocarbon dewpoint, consequently eliminating the absorber hydrocarbon foaming problems, and thereby allowing use of a colder amine that is more effective in H2S absorption (e.g., for production of a treated gas with 40 ppmv to 150 ppmv of H2S, or even lower).

While numerous gases with acid gas content (e.g., natural gas, synthesis gas, tail gas, or other gaseous hydrocarbons) may be used as untreated absorber feed gas in conjunction with the configurations and methods contemplated herein, it is especially preferred that the acid gas absorption and regeneration process is integrated with a Claus plant, a catalytic hydrogenation, and/or quench unit, wherein the H2S enriched acid gas from the selective absorption process is sent to the integrated Claus unit. With respect to further configurations and methods for selective H2S absorption from an acid gas comprising CO2, the same considerations apply as described in our copending International patent application with the serial number PCT/US04/26926, which is incorporated by reference herein.

Thus, specific embodiments and applications of configurations and methods for acid gas absorption and solvent regeneration have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. A plant comprising:
   A solvent regenerator having a upper section and a lower section;
   wherein the upper section has a first rich solvent inlet that is configured to provide a rich solvent reflux, and a second rich solvent inlet that is configured to provide a heated rich solvent regenerator feed;
   wherein the lower section is configured to produce a lean solvent from both the rich solvent reflux and the heated rich solvent regenerator feed;
   a heater operationally coupled to the regenerator and configured to heat a portion of a rich solvent to thereby provide the heated rich solvent regenerator feed;
   a second regenerator that is configured to receive a portion of the lean solvent from the lower section of the solvent regenerator and to produce a steam-containing overhead product and an ultra-lean solvent from the lean solvent;
   wherein the second regenerator is coupled to the solvent regenerator such as to deliver the steam-containing overhead product to solvent regenerator to thereby provide at least a portion of the stripping steam required in the solvent regenerator; and
   an absorber having an upper section and a lower section, wherein absorber is configured to receive the ultra-lean solvent from the second regenerator and the lean solvent from the solvent regenerator in the respective upper and lower sections.

2. The plant of claim 1 further comprising a flash vessel coupled to the absorber and configured to flash the rich solvent from the absorber.

3. The plant of claim 1 further comprising a heat exchanger that is configured to heat untreated gas prior to entry into the absorber to thereby cool the rich solvent reflux.

4. The plant of claim 1 wherein the lean solvent comprises an amine-based solvent.

5. A method of regenerating a solvent, comprising:
   feeding a first portion of a rich solvent as reflux to a first section of a regenerator, and feeding a heated second portion of the rich solvent to the first section of the regenerator;
   wherein the second portion has a temperature sufficient to provide at least a portion of stripping medium to the first section;
   forming in a second section of the regenerator a lean solvent from the first and second portions to thereby regenerate the solvent;
   feeding a first portion of a bottom product of the regenerator to a second regenerator to thereby form an ultra-lean solvent and a second steam-containing regenerator overhead product;
   feeding a second portion of the bottom product of the regenerator to a lower section of an absorber as a lean solvent, and feeding the ultra-lean solvent to an upper section of the absorber; and
   providing the second steam-containing regenerator overhead product to the solvent regenerator to thereby supply at least a portion of the stripping steam required in the solvent regenerator.

6. The method of claim 5 wherein a heat exchanger heats the second portion of the rich solvent using heat from a bottom product of the regenerator.

7. The method of claim 5 further comprising a step of cooling the first portion of the rich solvent prior to the step of feeding the first portion to the first section of the regenerator.

8. The method of claim 5 wherein the absorber produces the rich solvent.

9. The method of claim 8 further comprising a step of flashing the rich solvent before the rich solvent is divided in a first and second portion.

10. The method of claim 8 further comprising a step of heating untreated gas in a heat exchanger prior to entry into the absorber to thereby cool the first portion of the rich solvent.

11. The method of claim 8 wherein the absorber produces an absorber overhead product, and wherein the absorber overhead product is combined with a portion of the ultra-lean solvent to produce a semi-lean solvent.

12. The method of claim 11 further comprising a step of feeding the semi-lean solvent as a reflux stream to the upper section of the regenerator.

\* \* \* \* \*